United States Patent Office 3,706,737
Patented Dec. 19, 1972

3,706,737
NOVEL 5β,19-(EPOXYETHANOIMINO)-STEROIDS
Hansuli Wehrli, Schaffhausen, and Oskar Jeger, Zolliker-
 berg, Zurich, Switzerland, assignors to Ciba-Geigy Cor-
 poration, Ardsley, N.Y.
No Drawing. Filed June 22, 1970, Ser. No. 48,472
Claims priority, application Switzerland, June 25, 1969,
9,707/69
Int. Cl. C07c 173/00
U.S. Cl. 260—239.55 R                   10 Claims

ABSTRACT OF THE DISCLOSURE

Compounds of the class of 5β,19-(epoxyethanoimino)-androstanes have useful blood-circulation-promoting activity and are active ingredients of pharmaceutical compositions; a typical embodiment is 1'-methyl-2',17-dioxo-5β,19-(epoxyethanoimino)-androstane.

The present invention relates to 5β,19-(epoxyethano-imino)-androstanes, to pharmaceutical compositions comprising these compounds and their use.

More particularly, the present invention relates to compounds of Formula I,

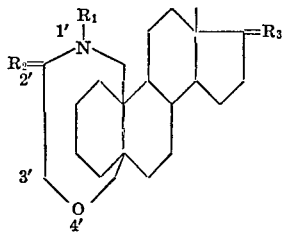

(I)

wherein
$R_1$ is lower alkyl,
$R_2$ is an oxo radical or two hydrogen atoms, and
$R_3$ is an oxo radical or a free or esterified or etherified hydroxyl group in the β-position together with a hydrogen atom or a lower alkyl radical,
whereby in the other unoccupied positions of the steroid structure there can be present double bonds and/or further monovalent, geminal bivalent or nongeminal polyvalent substituents such as free or esterified or etherified hydroxyl groups, halogen atoms, azido groups, amino groups, additional methyl groups, hydroxymethyl groups or free or protected oxo radicals, or epoxy radicals, imino and substituted imino groups (e.g. alkylimino groups such as methylimino groups), methylene groups, halo- and di-halo-methylene groups, ethano, hydroxyethano, alkoxy-ethano and oxoethano groups, or combinations thereof; and, if $R_2$ are two hydrogen atoms, the pharmaceutically acceptable acid addition salts thereof.

A lower alkyl group as $R_1$ has one to five carbon atoms and is, e.g. a methyl, ethyl, n-propyl, isopropyl, butyl or pentyl group. The stated esterified hydroxyl groups in 17-position can be derived from organic carboxylic acids of the aliphatic, or pyrrole series, particularly from those having 1–18 carbon atoms, e.g. they can be derived from formic acid, acetic acid, trifluoroacetic acid, propionic acid, butyric acid, isobutyric acid, valeric acids such as n-valeric acid or pivalic acid, hexanoic acids, such as 3,3-dimethylbutyric acid or 2-ethylbutyric acid, heptanoic, octanoic, nonanoic, decanoic and undecanoic acids, e.g. 10-undecanoic acid, lauric, myristic, palmitic or stearic acid, oleic acid, pyrrolecarboxylic acids such as, e.g. 2,4,5-trimethylpyrrole-3-carboxylic acid, 2,4-dimethyl-pyrrole-3-carboxylic acid, or 2-ethyl-4-methylpyrrole-3-carboxylic acid.

Suitable as etherified hydroxyl groups in the 17-position are, e.g. those which are derived from alcohols having 1–8 carbon atoms, e.g. from lower alkanols such as ethyl alcohol, methyl alcohol, propyl alcohol, isopropyl alcohol, butyl or amyl alcohols.

The lower aliphatic hydrocarbon radical in the 17α-position can be saturated or unsaturated, unsubstituted or, e.g. substituted by halogen atoms. Preferably, such as a radical contains 1–4 carbon atoms and is, in particular, methyl, ethyl, propyl, vinyl, allyl, 2-methylallyl, ethinyl, 1-propinyl, 2-propinyl, trifluoro-2-propinyl or trichloro-2-propinyl.

The compounds of the invention possess valuable pharmacological properties, especially blood-circulation-promoting activity. They are, however, also valuable intermediate products for the preparation of other useful, particularly pharmacologically effective, compounds.

The process for the production of the new compounds of Formula I of the present application is characterized by cyclising compounds of Formula II,

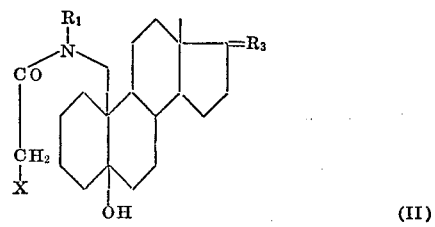

(II)

wherein $R_1$ and $R_3$ have the meaning given under Formula I, and X is a halogen atom such as, e.g. chlorine, bromine or iodine, in the presence of an acid-binding agent in a solvent which is inert and/or which contains hydroxyl groups, optionally converting the lactam grouping into a cyclic amine grouping, and/or oxidising a free 17-hydroxyl group to the oxo radical, and/or converting a 17-oxo-radical by reduction, or by introduction of a lower alkyl radical in the 17α-position, into a 17β-hydroxyl group, and/or esterifying or etherifying free hydroxyl groups, and/or liberating free hydroxyl groups from esterified hydroxyl groups, and/or optionally, converting compound of Formula I, wherein $R_2$ denotes two hydrogen atoms, into addition salts with inorganic or organic acids.

For the cyclisation of the compounds of Formula II, according to the process, metal hydroxides are preferably used as the acid-binding agent, such as silver hydroxide, sodium or potassium hydroxide solution, basic metal salts such as sodium and potassium carbonate, or sodium and potassium bicarbonate, alkali metal alcoholates such as, e.g. sodium methylate, sodium ethylate or potassium-tert. butylate, metal hydrides such as sodium hydride, calcium hydride or lithium aluminium hydride. The solvents used for the reaction according to the process are, preferably, aliphatic, alicyclic or aromatic hydrocarbons, especially benzene or toluene, ethers such as, e.g. diethyl ether, tetrahydrofuran, dioxane, or also dimethyl sulphoxide, dimethylformamide and/or alcohols such as, e.g. methanol, ethanol or tert. butanol.

The lactams obtained after cyclisation and embraced by Formula I, wherein $R_2$ is an oxo radical, can be coverted according to the process by reduction into the corresponding cyclic amines, wherein $R_2$ denotes two hydrogen atoms, and/or modified at the 17-oxygen group in a manner known per se. Thus, for example, a lactam embraced by Formula I may be converted by treatment with a complex hydride, such as lithium aluminium hydride, in an ether such as diethyl ether, tetrahydrofuran or dioxane, into the corresponding cyclic amine. Furthermore, a 17-hydroxyl group can, for example, be oxidized, either beforehand or following an eventual reduction of the lactam group, by means of the Oppenauer reaction or with the aid of compounds of 6-valent chromium, e.g. chromium trioxide sulphuric acid or chromium trioxide pyridine, to the oxo group, or a 17-oxo group can be reduced, e.g. by means of a complex hydride such as sodium borohydride or tri-tert. butoxylithium aluminum hydride, e.g. in tetrahydrofuran, to the 17β-hydroxyl group. If it is desired to produce compounds containing in the 17α-position one of the above mentioned hydrocarbon radicals, then a compound of Formula I obtained according to the process, and wherein $R_2$ is an oxo radical, is reacted with an organic metal compound of the respective hydrocarbon, or with a Grignard compound. For example, a lower alkyl group is introduced in the 17α-position by treatment with a lower alkyl magnesium halide, e.g. methyl magnesium halide, especially methyl magnesium bromide or -iodide.

Hydroxyl groups can be esterified in a manner known per se, e.g. by treatment with an acid halide or acid anhydride, in the presence of a tertiary base such as pyridine. Etherification is performed, e.g. by treatment of the 17-hydroxy compounds with a reactive ester of the alcohol concerned, especially with a hydrogen halide ester, for example, with an alkyl halide, in the presence of a base such as an alkali hydride or alkali hydroxide.

The liberation of esterified hydroxyl groups can be effected by alkaline hydrolysis.

The compounds of Formula II to be used as starting materials can be obtained, for example, according to the following reaction pattern:

peroxide in an alkaline medium and subsequent acetylation is obtained the corresponding 3-oxo-4β,5β-epoxy-17β,19-diacetoxy-androstane(2) which yields, after treatment with hydrazine hydrate and acetic acid in ethanol, 5β-hydroxy-17β,19-diacetoxy-Δ³-androstane(3). By hydrogenation, e.g. in the presence of platinum oxide in ethanol, 5β-hydroxy-17β,19-diacetoxy-androstane(4) is obtained and from that is obtained, by partial hydrolysis with methanolic-aqueous sodium bicarbonate solution, 5β,19β-diethydroxy-17β-acetoxy-androstane(5).

The latter is converted, by boiling with silver carbonate on Celite® in abs. benzene, into the 5β-hydroxy-17β-acetoxy-19-oxo-androstane(6), which is reacted with methylamine to give 5β-hydroxy-17β-acetoxy-19-(methylimino) androstane(7). Reduction of the latter with sodium borohydride in methanol/water, yields 5β-hydroxy-17β-acetoxy-19-(methylamino-androstane(8), which is acylated with chloroacetyl chloride in chloroform, in the presence of sodium hydroxide solution, to 5β-hydroxy-17β-acetoxy-19-(N-methyl-2-chloroacetamido)-androstane(9), usable as starting material of Formula II.

The above reaction sequence can be performed, in an analogous manner, with compounds containing in the 17-position, instead of the 17β-acetoxy group, another functionally modified hydroxyl group within the scope of the above given definition for $R_3$. It is also possible to start, however, with analogous compounds having ketalized 17-oxo-radical and, optionally, to liberate the 17-oxo radical before or after the above stated chloroacetylation, in order to obtain starting materials of Formula II having a protected or a free 17-oxo radical.

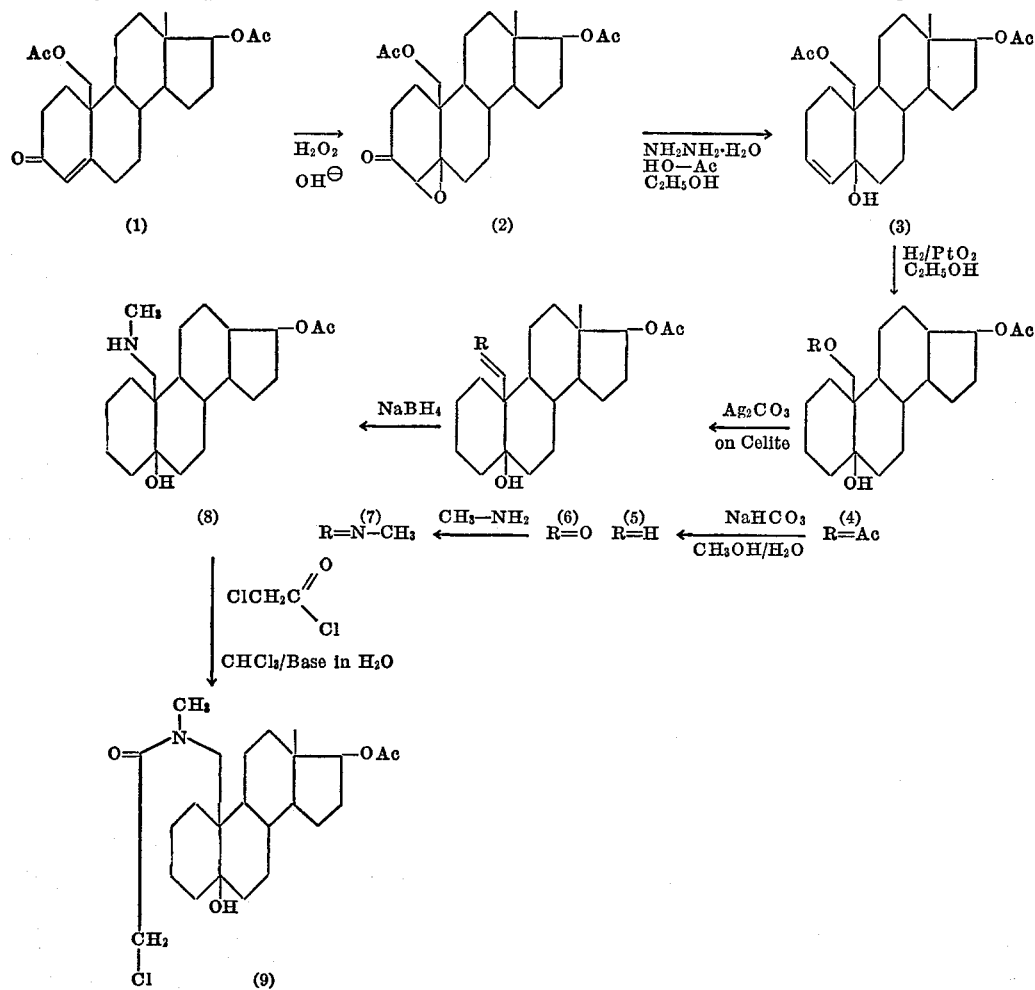

According to this reaction sequence, the starting compound is 3-oxo-17β,19-diacetoxy-Δ⁴-androstene(1), which can be substituted as defined. Compounds of this type are described in the literature. By oxydation with hydrogen The invention relates also to those embodiments of the process, whereby the starting compound is one obtained at any particular stage as an intermediate product, and the missing operations are carried out, or the process is interrupted at some stage, or whereby a starting material is formed under the reaction conditions, or whereby the reaction components are optionally present in the form of their salts.

According to the present invention, the new starting materials for the present process corrosponding to Formula II are also provided, especially the 5β-hydroxy-17β - acetoxy - 19 - (N-methyl-2-chloroacetamido)-androstane, the corresponding 17-oxo compound and the 5β - 17β - dihydroxy - 19 - (N-methyl-2-chloroacetamido)-17α-methyl-androstane.

Optionally, new compounds of Formula I obtained according to the invention and containing as $R_2$ two hydrogen atoms, thus constituting cyclic amines, are converted in the usual manner into their pharmaceutically acceptable acid addition salts. For example, to a solution of a corresponding compound of Formula I in an organic solvent, such as benzene, diethyl ether, methanol, ethanol or acetone, is added the acid desired as the salt component, or a solution of the acid, and the salt, which has precipitated immediately or after the addition of a second organic liquid such as, e.g. diethyl ether to methanol, is separated. Liberation of the bases from their acid addition salts is likewise performed in the usual manner by reaction with basic substances such as, e.g. sodium carbonate or sodium bicarbonate.

For use as active substances for pharmaceutical preparations it is possible to employ, instead of free basic compounds of Formula I, pharmaceutically acceptable acid addition salts therof, i.e. salts with such acids, the anions of which exhibit, in the case of the dosages in question, either no inherent pharmacological action or a desired one. Furthermore, it is of advantage if the salts to be used as active substances crystallize well and are not, or only slightly, hygroscopic. For salt formation with compounds of Formula I, suitable for the purpose, it is possible to use, e.g. hydrochloric acid, hydrobromic acid, sulphuric acid, phosphoric acid, methanesulphonic acid, ethanesulphonic acid, β-hydroxyethanesulphonic acid, acetic acid, malic acid, tartaric acid, citric acid, lactic acid, succinic acid, fumaric acid, maleic acid, benzoic acid, salicyclic acid, phenylacetic acid, mandelic acid, embonic acid or 1,5-naphthalenedisulphonic acid.

The present invention also relates to the production of pharmaceutical preparations for application in human or veterinary medicine and which contain the new pharmacologically effective compounds of Formula I of the present application as active substances, together with a pharmaceutical carrier. Used as carriers are organic or inorganic substances which are suitable for enteral administration, e.g. oral, parenteral, or topical administration. Suitable for the formation thereof are such substances which do not react with the new compounds such as, e.g. water, gelatine, lactose, starch, magnesium stearate, talcum, vegetable oils, benzyl alcohols, rubber, polyalkylene glycols, vaselines, cholesterol and other known medicament-carriers. The pharmaceutical preparations can be in solid form, e.g. as tablets, dragées or capsules, or in liquid or semi-liquid form as solutions, suspensions, emulsions, ointments or creams. Optionally, there pharmaceutical preparations are sterilized and/or they contain auxiliaries such as preservatives, stabilizers, wetting or emulsifying agents, salts for modifying the osmotic pressure, or buffers. They can also contain other therapeutically valuable substances. The new compounds can also serve as starting products for the production of other valuable compounds.

The compounds of Formula I can also be used as animal-feed additives.

The invention is further illustrated in the following examples, wherein the temperatures are given in degrees centigrade. The rotations are measured in chloroform; concentrations are given in brackets. The IR-spectra are measured in chloroform; the absorption bands are given in cm.$^{-1}$.

EXAMPLE 1

210 mg. of 5β - hydroxy-17β-acetoxy-19-(N-methyl-2-chloroacetamido)-androstane (see Example 6) are dissolved in 5 ml. of anhydrous tetrahydrofuran and 5 ml. of anhydrous benzene; and to this solution are successively added 35 mg. of sodium hydride and 0.02 ml. of a solution of 0.1 ml. of ethanol in 2 ml. of anhydrous tetrahydrofuran. The mixture is stirred for 30 minutes at 20° and then for 30 minutes at 40°. Ethyl acetate is added to the reaction mixture and the latter washed neutral with saturated sodium chloride solution. The crude product, obtained after concentration by evaporation in vacuo of the organic phase, is chromatographed in ethyl acetate on silica gel. Firstly obtained are 138 mg. of 1'-methyl-2'-oxo-17β - acetoxy - 5β,19 - (epoxyethanoimino)-androstane with M.P., after two crystallisations from acetone/hexane, 193–194°. $[\alpha]_D = +78°$ (0.31). IR: 1730, 1645, 1250.

Subsequent fractions yield 17 mg. of 1'-methyl-2'-oxo-17β - hydroxy - 5β,19 - (epoxyethanoimino)-androstane, M.P. 258–260°. $[\alpha]_D = +84°$ (0.28). IR: 3590, 1645.

EXAMPLE 2

80 mg. of 5β - hydroxy - 17β - acetoxy-19-(N-methyl-2-chloroacetamide)-androstane (see Example 6) are stirred at 40° with 14.6 mg. of sodium hydroxide in 7 ml. of ethanol for 3 hours. After the addition of ethyl acetate, the reaction solution is washed neutral with saturated sodium chloride solution and then concentrated by evaporation in vacuo. Chromatography of the residue in ethyl acetate yields 8 mg. of 1' - methyl - 2'-oxo-17β-hydroxy-5β,19-(epoxyethanoimino)-androstane, M.P. 258–260°. Identification according to mixed melting point, IR-spectrum and thin-layer chromatogram.

EXAMPLE 3

20 mg. of 1' - methyl - 2' - oxo - 17β - hydroxy-5β,19-(epoxyethanoimino)-androstane are acetylated in 2 ml. of an acetanhydride/pyridine (1:1) mixture for 15 hours at room temperature. The whole is then concentrated by evaporation in vacuo and the residue is recrystallised from acetone/hexane. By this means are obtained 18 mg. of 1' - methyl - 2' - oxo - 17β - acetoxy - 5β,19 - (epoxyethanoimino)-androstane, M.P. 193–194°. Identification with the substance of Example 1 according to mixed melting point, IR-spectrum and thin-layer chromatogram.

EXAMPLE 4

108 mg. of 1'-methyl-2'-oxo-17β-acetoxy-5β,19-(epoxyethanoimino)-androstane are boiled in 15 ml. of anhydrous diethyl ether for 5 hours with 60 mg. of lithium aluminium hydride. The reaction mixture is then carefully decomposed with a little water, filtered off from the precipitated aluminium hydroxide, subsequently washed with methylene chloride and the filtrate concentrated by evaporation. By this means are obtained 91 mg. of crude 1'-methyl - 17β - hydroxy - 5β,19 - (epoxyethanoimino)-androstane [IR: 3600]. This is acetylated in 10 ml. of acetic anhydride-pyridine-(1:1)-mixture for ca. 14 hours at room temperature. After concentration by evaporation in vacuo and chromatography of the resulting crude product in ethyl acetate/methanol (9:1) are obtained 53 mg. of 1' - methyl - 17β - acetoxy-5β,19-epoxyethanoimino)-androstane, M.P. after recrystallisation from methanol/water=122–123°. $[\alpha]_D = +46°$ (0.44). IR: 1730, 1250.

EXAMPLE 5

(a) 350 mg. of 1' - methyl - 17β - hydroxy - 5β,19-(epoxyethanoimino) - androstane, described in Example 4, are oxidised in 20 ml. of acetone with 0.15 ml. of 8 N solution of chromium trioxide in 8 N sulphuric acid for 15 minutes at 20°. 5 ml. of methanol are then added and the whole poured into aqueous sodium bicarbonate solution; the precipitated crude product is taken up in ethyl acetate, the organic solution washed with saturated sodium chloride solution until neutral and then concentrated by evaporation. The chromatography of the residue in ethyl acetate/methanol-(9:1) yields 240 mg. of 1'-methyl - 17 - oxo - 5β,19 - (epoxyethanoimino)-androstane, IR: 1735.

(b) 200 mg. of the product obtained according to (a) in 15 ml. of anhydrous dioxane are added dropwise to a solution of methyl magnesium iodide (prepared from 300 mg. of magnesium and 2 ml. of methyl iodide in 10 ml. of abs. ether) and the reaction mixture is subsequently refluxed for 2 hours. Water is then carefully added to the reaction mixture, the organic phase, after addition of ethyl acetate, separated and the aqueous phase extracted by shaking with ethyl acetate. The combined organic solutions are concentrated by evaporation. Chromatography of the residue in ethyl acetate/methanol-(4:1) yields 135 mg. of 1',17α - dimethyl - 17β - hydroxy - 5β,19-(epoxyethanoimino)-androstane, crystallised 3 times from acetone/water, IR: 3590.

EXAMPLE 6

The 5β - hyroxy - 17β-acetoxy-19-(N-methyl-2-chloroacetamido)-androstane used in the Examples 1 and 2 can be produced as follows:

(a) To 4 g. of 3-oxo-17β,19-diacetoxy-Δ⁴-androstene in 60 ml. of methanol/methylene chloride-(2:1)-mixture are added simultaneously, whilst stirring is maintained, 1 ml. of 10% aqueous sodium hydroxide solution and 6 ml. of 30% aqueous hydrogen peroxide solution. The mixture is then stirred for 3 days at +4° and ethyl acetate is added. The organic phase is separated, washed with saturated sodium chloride solution and concentrated by evaporation. For subsequent acetylation, excess acetic anhydride/pyridine-(1:1) is added to the residue, the mixture allowed to stand for ca. 14 hours and then concentrated by evaporation in vacuo. Chromatography of the residue on silica gel in benzene/ethyl acetate-(2:1) yields 3 g. of 3-oxo-4β,5β-epoxy-17β,19-diacetoxy-androstane, M.P. 127°. [α]$_D$=+122° (0.21). IR: 1730–1700, 1250.

(b) To 2.2 g. of 3-oxo-4β,5β-epoxy-17β,19-diacetoxy-androstane in 130 ml. of ethanol are added 0.5 ml. of glacial acetic acid and 1 ml. of hydrazine hydrate and the whole allowed to stand for 30 minutes at 20°. After the addition of ethyl acetate, washing is carried out with saturated sodium chloride solution and the organic phase concentrated by evaporation in vacuo. Chromatography of the residue in benzene/ethyl acetate-(2:1) yields 1.5 g. of 5β-hydroxy-17β,19-diacetoxy-Δ³-androstene, M.P. 128–129°. [α]$_D$=+62° (0.45). IR: 3580, 1730, 1250.

(c) 100 mg. of 5β-hydroxy-17β,19-diacetoxy-Δ³-androstene are exhaustively hydrogenated in 15 ml. of ethanol in the presence of 50 mg. of prehydrogenated platinum oxide catalyst. After removal by filtration of the catalyst, concentration and crystallisation of the crude product, 80 mg. of 5β - hydroxy-17β,19-diacetoxy-androstane, M.P. 102–103°, are obtained. [α]$_D$=+6° (0.34). IR: 3590, 1730, 1250.

(d) 100 mg. of 5β-hydroxy-17β,19-diacetoxy-androstane are boiled for 25 minutes in a mixture of 22 ml. of methanol and 2.55 ml. of 1% aqueous sodium bicarbonate solution. After the addition of ethyl acetate, washing with saturated sodium chloride solution, concentration by evaporation of the organic phase and chromatography of the residue in benzene/ethyl acetate(2:1 on silica gel, 60 mg. of 5β,19 - dihydroxy - 17β-acetoxy-androstane, M.P. 198–199°, are obtained. [α]$_D$=+18° (0.49). IR: 3590, 3440 (broad), 1725, 1250.

(e) 100 mg. of 5β,19-dihydroxy-17β-acetoxy-androstane are added to a suspension of 5 g. of silver carbonate on Celite [for method cp. M. Fétizon and M. Golfier, C. R. 267, 900 (1968] in 15 ml. of abs. benzene, dewatering is additionally carried out by azeotropic distilling off of ca. 5 ml. of benzene and refluxing is performed for 3 hours. This is followed by filtration through Celite, subsequent washing with benzene, concentration by evaporation in vacuo and crystallisation once from acetone/hexane of the obtained 5β - hydroxy-17β-acetoxy-19-oxo-androstane (90 mg.). M.P.=149° with decomposition. [α]$_D$=+11° (0.57). IR: 3590, 2740, 1730, 1250.

(f) 1 g. of 5β-hydroxy-17β-acetoxy-19-oxo-androstane is heated with 20 ml. of methylamine in 100 ml. of anhydrous benzene for 15 hours in a bomb-tube to 120°. Concentration by evaporation in vacuo is then performed, whereby 1.1 g. of crystalline 5β-hydroxy-17β-acetoxy-19-(methylimino)-androstane are obtained [IR: 3250 (broad), 2770 (CH₃–N=), 1730, 1660, 1250].

(g) This methylimino compound obtained according to (f) is reduced in 10 ml. of methanol with 1 g. of sodium borohydride in 3 ml. of water at 20° for 30 minutes. Ethyl acetate is then added to the reaction mixture, the whole thoroughly washed neutral with saturated sodium chloride solution and concentrated by evaporation, whereby 970 mg. of crystalline 5β-hydroxy-17β-acetoxy-19-(methylamino)-androstane are obtained [IR: 3300–2600, 1730, 1250].

(h) The methylamino compound obtained according to (g) is dissolved, together with 750 mg. of chloroacetyl chloride, in 30 ml. of chloroform. With vigorous stirring, 235 mg. of sodium hydroxide in 6 ml. of water are added at room temperature. The organic phase is separated after 10 minutes, washed with saturated sodium chloride solution, concentrated by evaporation in vacuo and the residue chromatographed on silica gel in ethyl acetate. By this means are obtained 850 mg. of 5β-hydroxy-17β-acetoxy-19-(N-methyl-2-chloroacetamido)-androstane, M.P. 218–220°. [α]$_D$=+52° (0.50). IR: 3360, 1730, 1640, 1250.

Subsequent fractions further yield 60 mg. of 5β,17β-dihydroxy - 19-(N-methyl-2-chloroacetamido)-androstane, M.P. 223–226°. [α]$_D$=+52° (0.46). IR: 3600, 3350, 1640.

EXAMPLE 7

200 mg. of 1'-methyl-2'-oxo-17β-acetoxy-5β,19-(epoxyethanoimino)-androstane are refluxed for 3 hours in 6 ml. of a saturated solution of K₂CO₃ (potassium carbonate) in methanol.

The reaction mixture is then taken up in ethyl acetate, washed neutral with a saturated sodium chloride solution, dried over magnesium sulphate and evaporated to dryness in vacuo. The resulting residue is taken up in ethyl acetate and chromatographically purified using silica gel.

110 mg. of 1'-methyl-2'-oxo-17β-hydroxy-5β,19-(epoxyethanoimino)-androstane are obtained which melt at 258–260° after recrystallisation from a mixture of methylene chloride/hexane. [α]$_D$=+84° (0.28). IR: 3590, 1645.

EXAMPLE 8

137 mg. of 1'-methyl-2'-oxo-17β-hydroxy-5β,19-(epoxyethanoimino)-androstane, are dissolved in acetone and mixed with an excess of 8 N chromium trioxide in 8 N sulphuric acid. After 30 minutes the reaction mixture is taken up in ethyl acetate, washed neutral with a saturated sodium chloride solution, dried over magnesium sulphate and evaporated to dryness in vacuo.

The resulting residue is taken up in a mixture of ethylacetate/methanol (20:1) and chromatographed on silica-gel.

123 mg. of homogeneous 1'-methyl-2',17-dioxo-5β,19-(epoxyethanoimino)-androstane is obtained which melts at 268–273° (decomposition) after recrystallisation from a mixture of methylene chloride/hexane. IR: 1740, 1645.

What we claim is:

1. A compound of Formula I,

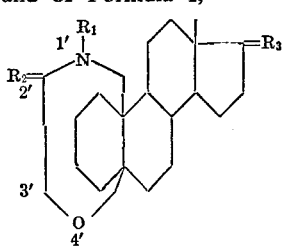

wherein
$R_1$ is lower alkyl,
$R_2$ is an oxo radical or two hydrogen atoms, and
$R_3$ is an oxo radical or hydroxy, hydroxy esterified with an aliphatic carboxylic acid having 1–18 carbon atoms or hydroxy etherified with an alcohol having 1–8 carbon atoms in the β-position together with a hydrogen atom or a lower alkyl radical, and when $R_2$ is two hydrogen atoms, the pharmaceutically acceptable acid addition salts thereof.

2. A compound according to claim 1, which is 1'-methyl-2'-oxo-17β-hydroxy - 5β,19 - (epoxyethanoimino)-androstane.

3. A compound according to claim 1, which is 1'-methyl-2',17-dioxo - 5β,19 - (epoxyethanoimino)-androstane.

4. A compound according to claim 1, which is 1'-methyl-17β-hydroxy-5β,19-(epoxyethanoimino)-androstane and the pharmaceutically acceptable acid addition salts thereof.

5. A compound according to claim 1, which is 1'-methyl-17-oxo - 5β,19 - (epoxyethanoimino)-androstane and the pharmaceutically acceptable acid addition salts thereof.

6. A compound according to claim 1, which is 1',17α-dimethyl - 17β - hydroxy-5β,19-(epoxyethanoimino)-androstane and the pharmaceutically acceptable acid addition salts thereof.

7. A compound of Formula II,

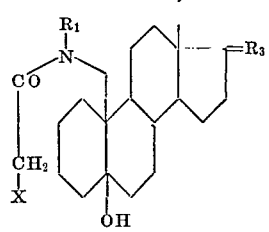

wherein
$R_1$ is lower alkyl,
$R_3$ is an oxo radical, hydroxyl, hydroxy esterified with an aliphatic carboxylic acid having 1–18 carbon atoms or hydroxy etherified with an alcohol having 1–8 carbon atoms in the β-position together with a hydrogen atom or a lower alkyl radical, and when $R_2$ is two hydrogen atoms, the pharmaceutically acceptable acid addition salts thereof, and
X is halogen.

8. A compound according to claim 7, which is 5β-hydroxy-17β-acetoxy - 19 - (N-methyl-2-chloroacetamido)-androstane.

9. A compound according to claim 7, which is 5β-hydroxy-17-oxo - 19 - (N-methyl-2-chloroacetamido)-androstane.

10. A compound according to claim 7, which is 5β,17β-dihydroxy-19-(N-methyl-2-chloroacetamido)-androstane.

No references cited.

HENRY A. FRENCH, Primary Examiner

U.S. Cl. X.R.

260—397.4, 397.5, 999